No. 667,330. Patented Feb. 5, 1901.
F. N. MARTIN.
TILE GUARD.
(Application filed Nov. 2, 1900.)
(No Model.)
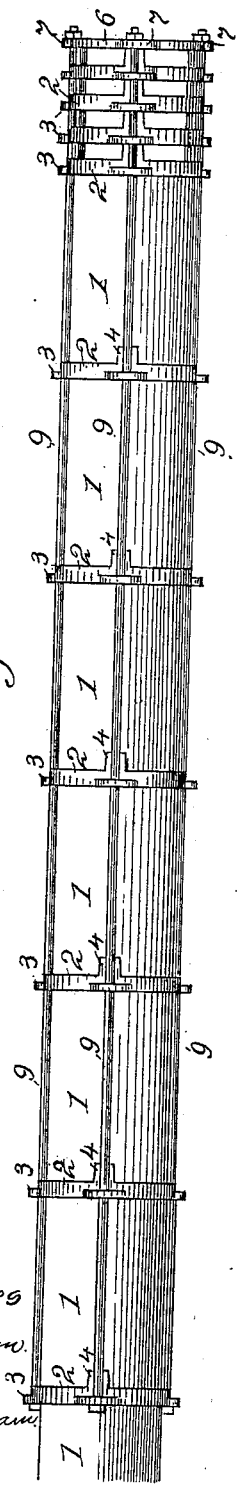
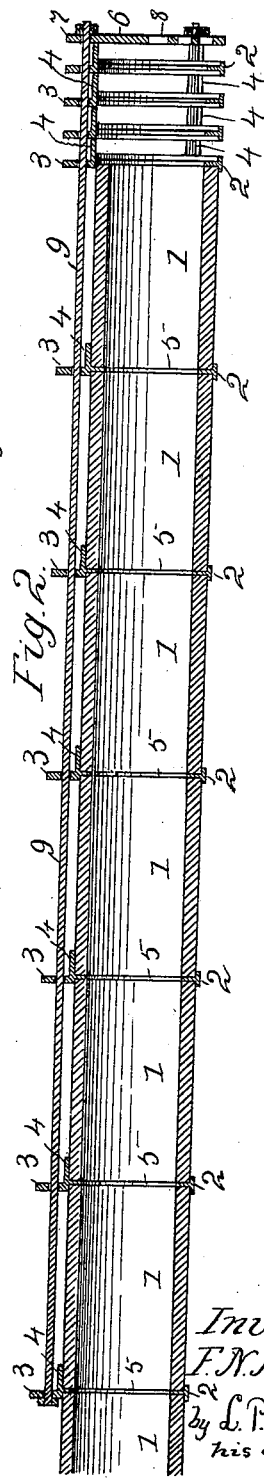
Witnesses
Nora Graham
Ena Graham
Inventor
F. N. Martin
by L. P. Graham
his attorney.

UNITED STATES PATENT OFFICE.

FENTON N. MARTIN, OF VIRDEN, ILLINOIS.

TILE-GUARD.

SPECIFICATION forming part of Letters Patent No. 667,330, dated February 5, 1901.

Application filed November 2, 1900. Serial No. 35,205. (No model.)

*To all whom it may concern:*

Be it known that I, FENTON N. MARTIN, of Virden, in the county of Macoupin and State of Illinois, have invented a certain new and useful Tile-Guard, of which the following is a specification.

This invention provides superior facilities for keeping animals out of tiles while holding the tile in place and permitting a full flow of water. It is exemplified in the structure hereinafter described, and it is defined in the appended claims.

In the drawings forming part of this specification, Figure 1 is a plan of an end of a line of tile with my invention attached thereto. Fig. 2 is a diametrical section through the tile and the guard thereon. Fig. 3 is an elevation of the end ring of the guard. Fig. 4 is an elevation of one of the rings included in the structure of the guard and used to secure the guard to the tile.

Sections of drain-tile are shown at 1. At 2 are shown rings used in building up the guard and in attaching the guard to the tile. Each ring is preferably formed as shown in Fig. 4, although this form may be modified considerably without departing from the principle of my invention, as hereinafter explained. In this case the faces of the rings are recessed to receive the ends of sections of tile, and a central rib 5 separates one section of tile from another. Lugs 3 are formed on the perimeters of the rings 2 and are bored to receive securing-bolts 9. Lugs 4 extend from one side of each ring in a direction parallel with the axis thereof. The end ring 6 of the guard has lugs 7, corresponding to the lugs 3 of rings 2, and it is cross-barred somewhat, as shown at 8 in Fig. 3. Bolts 9 are used to secure the different rings of the guard together and to connect the guard with the tile.

In forming a guard a number of rings 2 are placed between sections of tile with the ends of the sections resting in the recessed faces and against ribs 5. A plurality of the rings 2 are placed one against the lugs 4 of another at the end of the line of tile. The end ring 6 is placed against the outermost ring 2, and all the rings are secured together by bolts 9. As many rings are placed between sections of tile as are needed to form a firm support for the guard and as many rings are placed beyond the end of the line of tile as are needed to provide for a full flow of water from the tile. The lugs 4 separate the rings that form the guard sufficiently far to provide water-passages, but not animal-passages, and the cross-bars of the end ring are similarly separated. The configuration of the water-passages in the end ring is immaterial.

The rings 2 are all made alike as a matter of convenience; but it is obvious that the lugs 4 are useless on the rings that are used between sections of tile and that the recesses in the faces of the rings for the ends of the tile-sections are useless in the intermediate rings of the guard.

The particular construction herein shown and described is intended to be typical merely of the more generic ideas embodied in the claims, and all mechanical equivalents of the different elements specified are intended to be covered the same as if they were each and all specifically designated.

I claim—

1. In a tile-guard, the combination with a line of tile of a guard adapted to fit against the end of the line of tile, rings embracing the line of tile and rods connecting the guard with the rings on the tiles substantially as described.

2. A tile-guard extended beyond the end of a line of tile and held in position by connections with rings embracing a plurality of the sections of the line of tile, substantially as described.

3. A tile-guard extended beyond the end of a line of tile and held in position by connections with a plurality of rings set between sections of the line of tile, substantially as described.

4. A tile-guard composed of a plurality of separated rings, substantially as described.

5. A tile-guard composed of a plurality of rings held separate one from another by intervening lugs, substantially as described.

6. A tile-guard composed of a plurality of separated rings, the end ring of the set being cross-barred, substantially as set forth.

7. A tile-guard composed of a set of separated rings, rings embracing the tile at the joints thereof and bolts securing the rings of the guard to the tile-embracing rings, substantially as described.

In testimony whereof I sign my name in the presence of two subscribing witnesses.

FENTON N. MARTIN.

Witnesses:
CHAS. E. BURNETT,
CHAS. RANSOM.